United States Patent
Brown (10) Patent No.: US 11,111,035 B2
(45) Date of Patent: Sep. 7, 2021

(54) METHOD OF FORMING A SPACE-BORNE BODY

(71) Applicant: Trevor Brown, Auburn, AL (US)

(72) Inventor: Trevor Brown, Auburn, AL (US)

( * ) Notice: Subject to any disclaimer, the term of this patent is extended or adjusted under 35 U.S.C. 154(b) by 401 days.

(21) Appl. No.: 16/000,268

(22) Filed: Jun. 5, 2018

(65) Prior Publication Data

US 2019/0023425 A1 Jan. 24, 2019

Related U.S. Application Data

(60) Provisional application No. 62/535,366, filed on Jul. 21, 2017.

(51) Int. Cl.
| | | |
|---|---|---|
| *B64G 99/00* | (2009.01) | |
| *B64G 1/24* | (2006.01) | |
| *B64G 1/34* | (2006.01) | |
| *B64G 1/40* | (2006.01) | |
| *B64G 7/00* | (2006.01) | |

(52) U.S. Cl.
CPC .............. *B64G 9/00* (2013.01); *B64G 1/242* (2013.01); *B64G 1/34* (2013.01); *B64G 1/407* (2013.01); *B64G 7/00* (2013.01); *B64G 2700/00* (2013.01)

(58) Field of Classification Search
CPC .......... B64G 1/407; B64G 1/242; B64G 1/34; B64G 7/00; B64G 2700/00; B64G 9/00; B64G 1/1007
See application file for complete search history.

(56) References Cited

U.S. PATENT DOCUMENTS

| | | |
|---|---|---|
| 6,726,153 B1 | 4/2004 | Campbell |
| 8,628,044 B2 | 1/2014 | Poulos |
| 2008/0151811 A1 | 6/2008 | El-Damhougy et al. |

FOREIGN PATENT DOCUMENTS

| | | |
|---|---|---|
| CN | 101850855 | 10/2010 |
| CN | 101948013 | 1/2011 |
| CN | 101948013 A | 1/2011 |
| CN | 102514740 A | 6/2012 |
| CN | 102923322 A | 2/2013 |
| RU | 2551553 C1 | 5/2015 |
| RU | 2015128741 A | 1/2017 |

OTHER PUBLICATIONS

PCT/US2018/040986; Transmittal of the International Search Report and the Written Opinion dated Sep. 19, 2018. 8 pages.
Michele Gates et al.; The Asteroid Redirect Mission and Sustainable Human Exploration, 65th International Astronautical Congress, Toronto, Canada, © 2014, pp. 1 through 9.

(Continued)

*Primary Examiner* — Valentina Xavier
(74) *Attorney, Agent, or Firm* — Fitch, Even, Tabin & Flannery, LLP (57) ABSTRACT

Artificially directing a plurality of space-borne natural bodies to a target accretion region, such that gravitational forces amongst the plurality of space-borne natural bodies within the target accretion region produces an agglomerated space-borne body comprised of at least portions of the plurality of space-borne natural bodies. These teachings will accommodate use of a variety of space-borne natural bodies including asteroids, comets, and moons.

20 Claims, 4 Drawing Sheets

(56) References Cited

OTHER PUBLICATIONS

Stephen Ornes, Asteroids: Avoiding an Earthly Smashup, Science News for Student, http://www.sciencenewsforstudents.org/article/asteroids-earlthly-smashup, pp. 1 through 9. Aug. 26, 2014-2:23 AM EST.
Nick Dinicola (Archive/Contributor/412), Creation and Destruction in 'Solar 2', popmatters, http://www.popmatters.com/post/144686-solar2, Jul. 8, 2011, pp. 1-4.
Kongregate, Post looking for information regarding a gravity well game that involved joining asteroids to form a planet, at least as early as Oct. 2017, p. 3.
Carl Sagan et al. Long-Range Consequences of Interplanetary Collisions, Science and Technology, vol. 10, No. 4 (Summer 1994). Please note that we have only the first page of what appears to be a 5 page document.
How Will NASA's Asteroid Redirect Mission Help Humans Reach Mars?, NASA, https://www.nasa.gov/press-release/white-house-nasa-to-discuss-asteroid-redirect-mission-s-importance-for-journey-to-mars, Oct. 26, 2017, pp. 1-23.
Greg Matloff, Siberian Dawn: Tapping Solar System Resources, Baen Books, http://www.baen.com/siberiandawn, Oct. 26, 2017, pp. 1-10.
Jet Propulsion Laboratory Asteroid Redirect Vehicle, author unknown, published at least by Jul. 20, 2017.
Trevor Brown (2011) ; An Emerging Concept for the Medium of Space; Comprative Strategy, 30:4, 373-380, DOI: 10.1080/01495933.2011.605028; Published online: Sep. 26, 2011.
Trevor Brown (2020) Revolutionizing Space Warfare: "Power Star" Space Solar Power Concept, Astropolitics, 18:1, 51-72, DOI: 10.1080/14777622.2020.1718999; Published online: Apr. 6, 2020.
Trevor Brown; The Space Review in association with Spacenews; A Space Joint Stock Company; https://www.thespacereview.com/article/2073/1; Monday, Apr. 30, 2012; 14 pages.
Trevor Brown; The Space Review in association with Spacenews; SSP: a Spherical Architecture; https://www.thespacereview.com/article/1383/1; Monday, Jun. 1, 2009; 6 pages.
Trevor Brown; Emerging Dynamics of the New Space Policy; High Frontier Journal vol. 7, No. 2, Feb. 2011, pp. 49-51, 3 pages. Digital Extended Version.
Trevor Brown; Space-Land Battle; Military Review; Nov.-Dec. 2018; 12 Pages.
Trevor Brown; Viewpoints—Space and the Sea: Strategic Considerations for the Commons; Astropolitics, 10:234-247, 2012.
Trevor Brown; Soft Power and Space Weaponization; Air & Space Power Journal, Spring 2009; Published Mar. 1, 2009; 8 pages.
Trevor Brown (2011) The American and Soviet Cold War Space Programs, Comparative Strategy, 30:2, 177-185, DOI: 10.1080/01495933.2011.561736; Published online: May 9, 2011; 10 pages.
Trevor Brown; The Digital Galactic Complex; Springer International Publishing; 86 pages; Authors 2016.

FIG. 5

METHOD OF FORMING A SPACE-BORNE BODY

RELATED APPLICATION(S)

This application claims the benefit of U.S. Provisional application No. 62/535,366, filed Jul. 21, 2017, which is incorporated by reference in its entirety herein.

TECHNICAL FIELD

These teachings relate generally to the manipulation of space-borne natural bodies.

BACKGROUND

Technology exists to allow mankind to visit space, and some political and market will currently exists to modestly push the boundaries of space exploration. Achieving anything beyond merely brief and/or very small-in-scale off-Earth visitations, however, mostly remains the stuff of science fiction.

There are a number of challenges to becoming a genuine space-faring civilization. Included amongst these challenges are the high costs of moving resources off of the Earth in order to support activities in space and the very great distances involved to actually go anywhere of value. The applicant has determined that, ultimately, establishing a genuine, multi-faceted, and prolonged off-Earth presence will benefit from (and possibly require) a market-based foundation. Unfortunately, present logistical realities make such a foundation highly unlikely.

BRIEF DESCRIPTION OF THE DRAWINGS

The above needs are at least partially met through provision of the method of forming a space-borne body described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments provide for artificially directing a plurality of space-borne natural bodies to a target accretion region, such that gravitational forces amongst the plurality of space-borne natural bodies within the target accretion region produces an agglomerated space-borne body comprised of at least portions of the plurality of space-borne natural bodies. These teachings will accommodate use of a variety of space-borne natural bodies including asteroids, comets, and moons.

By one approach, the space-borne natural bodies to be artificially directed as described above are first identified and selected based upon one or more selection criteria. Examples of a useful selection criterion include but are not limited to elemental makeup, a current relative trajectory, and a current relative velocity.

By one approach, artificially directing the space-borne natural bodies comprises, at least in part, selectively modifying orbital eccentricity and/or inclination for at least one of the space-borne natural bodies. By one approach, artificially directing the space-borne natural bodies comprises, at least in part, increasing (or decreasing) relative acceleration and/or velocity between at least two of the space-borne natural bodies towards one another. By one approach, artificially directing the space-borne natural bodies comprises, at least in part, selectively controlling an angle at which at least two of the space-borne natural bodies collide with one another or selectively controlling a distance between two such bodies.

Generally speaking, these teachings provide for fragmenting at least one of the space-borne natural bodies to form corresponding fragments. Gravitational forces within the target accretion region cause at least some of the fragments to accrete with the agglomerated space-borne body. If desired, the foregoing use of gravity can be supplemented by applying a non-gravitational supplemental force within the target accretion region to further support production of the agglomerated space-borne body.

The resultant agglomerated space-borne body can have essentially any desired size. By one approach, the agglomerated space-borne body can be large enough to fairly constitute a dwarf planet. The agglomerated space-borne body can be formed in a manner such that the agglomerated space-borne body is and remains in orbit around a celestial body of choice (such as the sun or a planet within the local solar system such as Earth).

The resultant agglomerated space-borne body can be subsequently utilized in a variety of ways. By one approach a human habitat can be formed on the agglomerated space-borne body to support temporary and/or permanent human residency. By another approach, in lieu of the foregoing or in combination therewith, the agglomerated space-borne body can be mined to obtain mineral resources. Those mineral resources can then be utilized to manufacture finished items. That manufacturing may occur in whole or in part on the agglomerated space-borne body itself, on a man-made platform in space, or on a moon or planet such as Earth or Mars.

If desired, and again in lieu of the foregoing or in combination therewith, a wireless communications node can be operated from the agglomerated space-borne body. This wireless communications node can, for example, support wireless communications between various points on the agglomerated space-borne body itself, between points on the agglomerated space-borne body and points on Earth, or between points on the Earth and other points that are neither on the Earth nor on the agglomerated space-borne body (such as a point on a non-Earth planet such as Mars). Such wireless communications can constitute any of a wide variety of communications methodologies and protocols including, but not limited to, at least one of Internet Protocol version 4 and Internet Protocol version 6.

So configured, agglomerated space-borne bodies having any of a wide variety of sizes, locations/orbits, and/or constituent elements can be formed and leveraged to serve a wide variety of needs and purposes.

Figure 1:
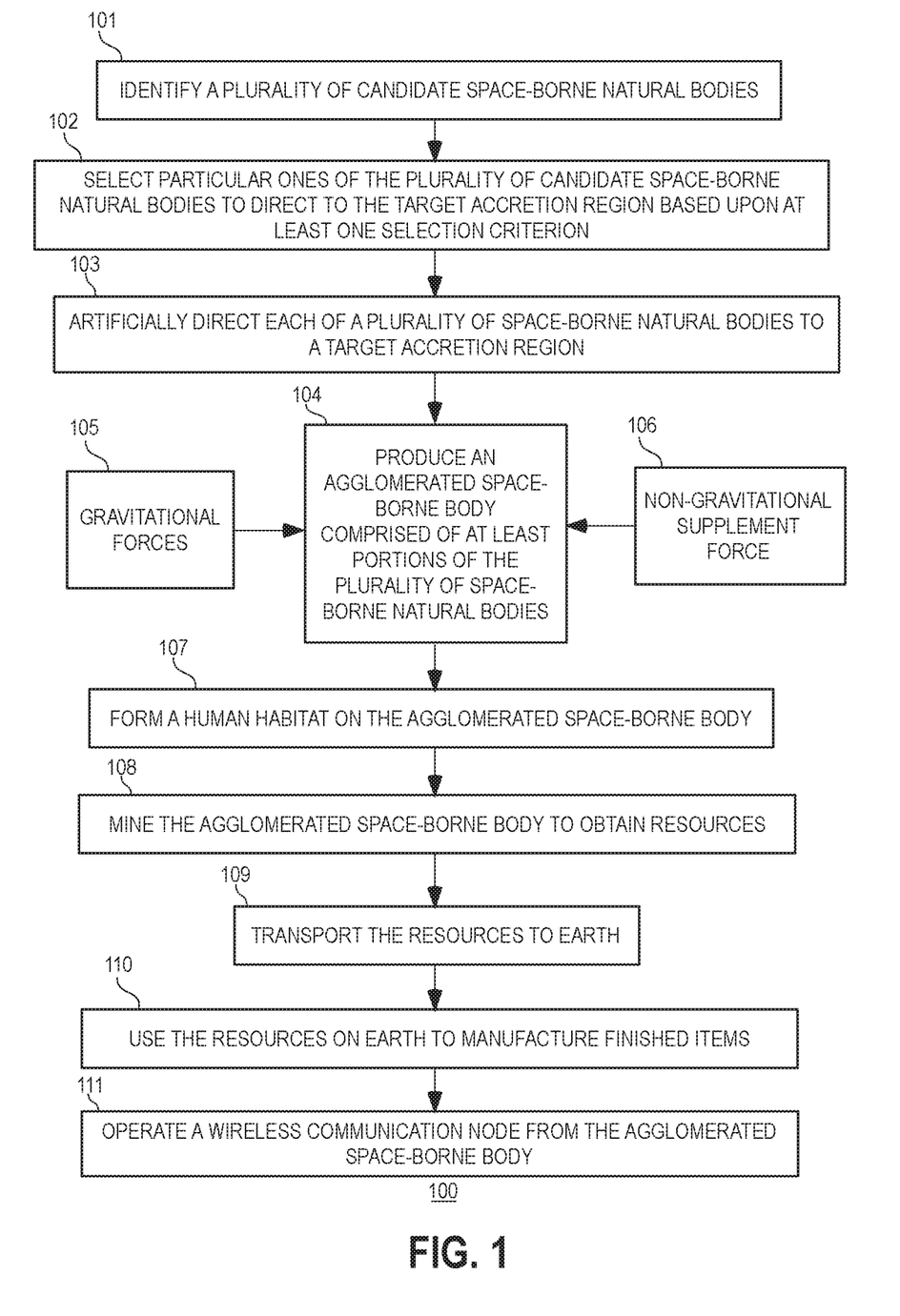
FIG. 1 comprises a flow diagram as configured in accordance with various embodiments of these teachings.
Figure 2:
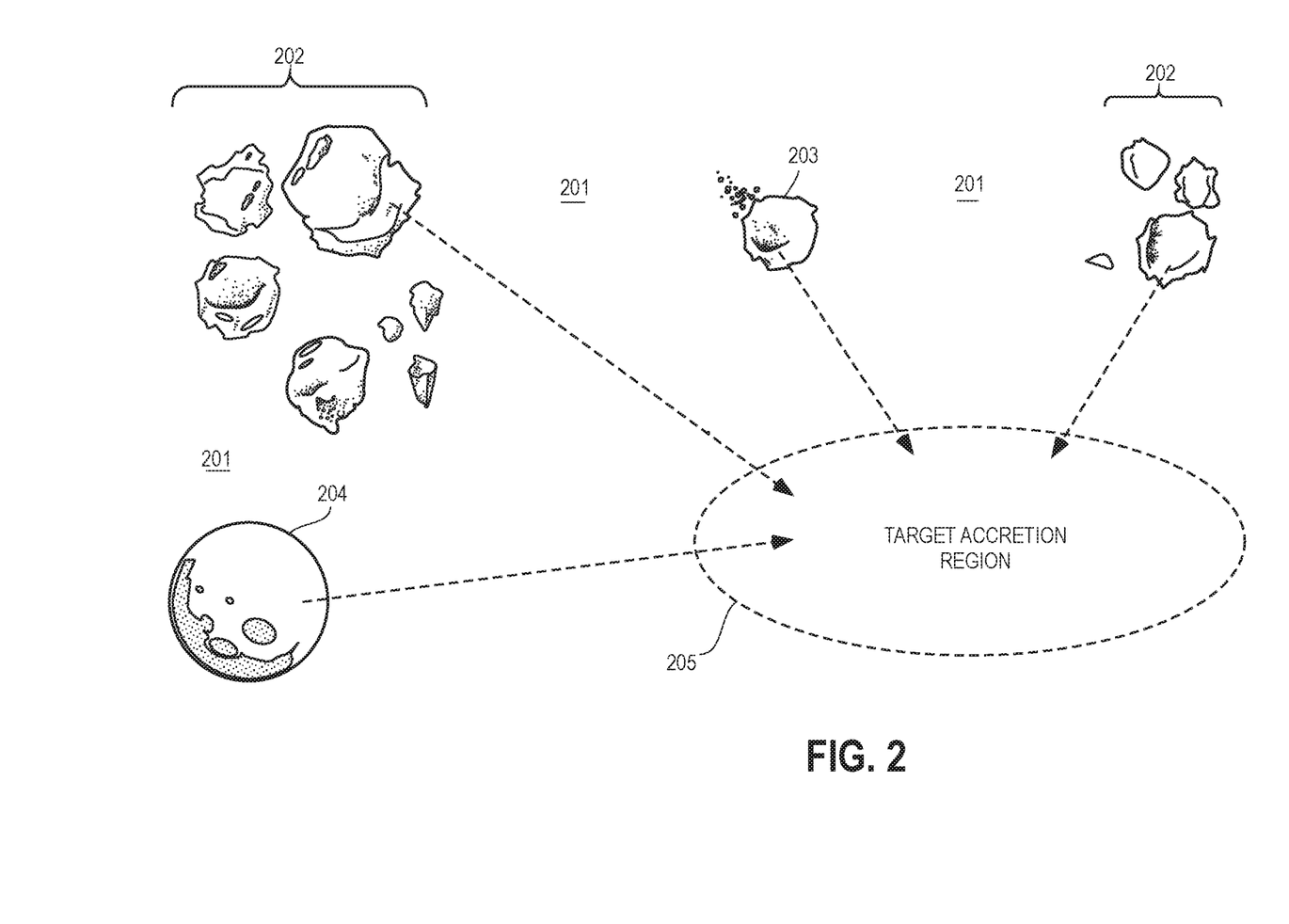
FIG. 2 comprises a schematic diagram depicting selection and artificial direction of space-borne natural bodies to a target accretion region as configured in accordance with various embodiments of these teachings.

These and other benefits may become clearer upon making a thorough review and study of the following detailed description. Referring now to the drawings, and in particular to FIGS. 1 and 2, an illustrative process 100 that is compatible with many of these teachings will now be presented.

At block 101, this process 100 provides for identifying a plurality of candidate space-borne natural bodies 201. These candidate space-borne natural bodies 201 can comprise any of a variety of space-borne natural bodies including, but not limited to, asteroids 202, comets 203, and even planetary moons 204. These candidates can be identified using any appropriate method including local or remotely-based visual identification platforms such as telescopes.

At block 102 this process 100 provides for selecting particular ones of this plurality of candidate space-borne natural bodies 201 to direct to a target accretion region 205 based upon at least one selection criterion. These teachings will accommodate a variety of selection criteria including, for example, elemental makeup of each candidate (for example, by using one or more spectrometers to identify at least some of the materials that comprise the object), a current relative trajectory of each candidate, and a current relative velocity of each candidate. Other selection criteria examples can include size, shape, and mass of each candidate, as well as a relative distance between each candidate and the target accretion region 205.

As a more specific example, bodies having a radii between 100 m and 1 km and beyond may represent the most vulnerable bodies (for the purposes of this process 100), although the make-up of these bodies will also contribute to their vulnerability. Bodies comprised of significant amounts of ice, for example, will be more vulnerable than bodies mostly comprised of rock.

As another example, care can be taken to identify relatively large celestial objects that are abundant in the gases of hydrogen and oxygen. Water, consisting of both hydrogen and oxygen, is abundant amongst comets but also in asteroids to a certain extent. Such materials can be useful to help host a human habitat as described below.

The target accretion region 205 is selectively located per the needs and requirements of a given application setting. Accordingly, by one approach the target accretion region 205 may be relatively close to Earth (and may represent, for example, a position that corresponds to an eventual Earth-centric orbit). By another approach, and as another example, the target accretion region 205 may be located at a distance from the sun that is comparable to the Earth's own distance from the sun (and may therefore represent a position that corresponds to an eventual helio-centric orbit at a distance from the sun that is comparable to the Earth's distance from the sun).

It should be understood that the target accretion region 205 is not necessarily a static location in space. Instead, the target accretion region 205 may well move (albeit along a particular trajectory) through space with time. For example, the target accretion region 205 may move along a path that represents an elliptical orbit around the sun or other body.

At block 103 this process 100 provides for artificially directing each of the selected space-borne natural bodies to the target accretion region 205. While it is likely that all of the selected space-borne natural bodies will be subject to this artificial direction in a simultaneous manner at some point during this process 100, in a typical application setting different ones of the selected space-borne natural bodies may be subjected to initial direction in a non-simultaneous (though likely synchronized) manner.

There are various ways by which this artificial direction can be instigated and/or maintained. By one approach, for example, a directed-force explosion can serve to so direct a particular body. By another approach, and as another example, a constructively contrived collision between the selected body and another body can impart the desired direction. And as yet another approach and example, man-made vehicles can be employed to impart the appropriate artificial direction to the body. U.S. Pat. No. 6,726,153 (entitled Photon Momentum Transfer Plane For Asteroid, Meteoroid, And Comet Orbit Shaping), for example, provides teachings in these regards. As the present teachings are not overly sensitive to any particular selection in these regards, further elaboration in these regards will not be provided here for the sake of brevity.

These teachings will accommodate various facets to the aforementioned artificial directing of the space-borne natural bodies. As one example, artificially directing a particular space-borne natural body can comprise, at least in part, selectively modifying orbital eccentricity and inclination for that particular space-borne natural body (where inclination will be understood to refer to the angle between the plane of an orbit and the corresponding relevant equator). As another example, artificially directing the space-borne natural bodies can comprise, at least in part, increasing relative acceleration between at least two of the space-borne natural bodies towards one another. And as yet another example, artificially directing the space-borne natural bodies can comprise, at least in part, selectively controlling an angle at which at least two of the plurality of space-borne natural bodies collide with one another in the target accretion region 205.

Just as an externally-applied force may serve to initiate the above-described process of directing the selected space-borne natural bodies towards the target accretion region 205, if desired, additional externally-applied force may be applied on a selective basis to further steer particular ones of the bodies or to slow down or to stop further forward movement of particular ones of the bodies.

By one approach, these selected space-borne natural bodies 201 are selectively directed not only into the target accretion region 205 but into controlled collisions with one another, thus fragmenting at least some of the selectively directed space-borne natural bodies 201. Such collisions can be managed by taking into account the mass ratios of the targets and impactors and the angles at which they will impact, as well as the shapes and the rotation rates of the bodies involved in the collisions. Generally speaking, smaller bodies comprised of relatively strong material may require higher impact velocities than larger bodies of weaker material.

Figure 3:
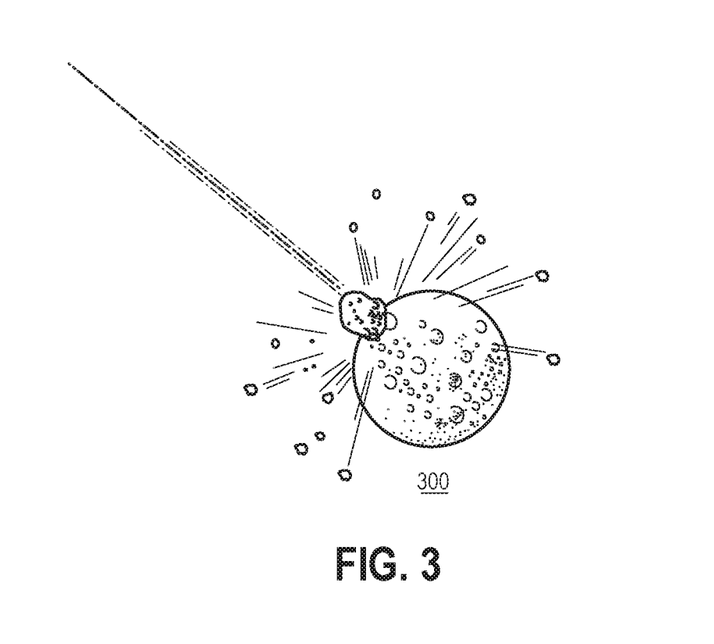
FIG. 3 comprises a conceptual view that depicts contact and fragmentation as configured in accordance with various embodiments of these teachings.
Figure 4:
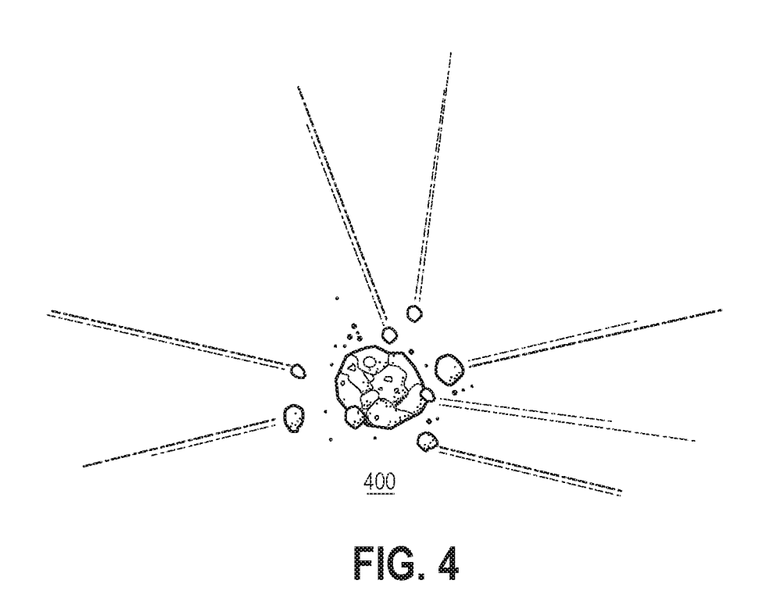
FIG. 4 comprises a conceptual view that depicts contact, fragmentation, and agglomeration as configured in accordance with various embodiments of these teachings.

Fragmenting the space-borne natural bodies 201 forms corresponding fragments as is generally illustrated in the scenes 300 and 400 presented in FIGS. 3 and 4. Generally speaking, although tens, hundreds, or even thousands of bodies 201 may be selectively directed into the target accretion region 205 per this process, collisions will often occur in a pairwise manner; i.e., between two and only two such bodies per collision.

As a more specific example, asteroids from the main belt between Mars and Jupiter with $e \approx 0.1$ may be directed to collide at typical velocities on the order of 2 $kms^{-1}$. For bodies with a mass ratio of m/M=0.1 the resultant energy of the collision would then be around $Q=2\times 10^9$ erg $g^{-1}$. This is enough to destroy quite large solid bodies that have s 100 km.

By one approach, the aforementioned selective direction of such bodies can serve to literally direct one body into another via intersecting trajectories. By another approach, in lieu of the foregoing or in combination therewith, two (or more) such bodies can be directed so that their directed trajectories do not intersect but instead bring the two (or more) bodies into close proximity to one another, the closeness being such that the gravitational attraction between the bodies is sufficient to draw the bodies closer yet until they in fact collide with one another.

It should be noted that although fragmentation through collision or other means is likely (or even intentionally caused), fragmentation alone is not the intended final product of the described selection and direction activity. Instead, to at least a very large extent, the desired end result (as is described below) is to ultimately combine such bodies and at least the bulk (such as, for example, at least 80 percent or 90 percent) of their corresponding fragments into an agglomerated whole.

That said, these teachings will accommodate selecting particular fragments and diverting such fragments to serve other purposes. By one approach, for example, it may be desired to prevent a particular fragment from joining the agglomerated whole. In that case, artificial external forces can be employed to direct this particular fragment away from the gravitational attraction of the agglomerated whole. By another approach, and as another example, a particular fragment may be largely comprised of some particularly valuable material. In that case, artificial external forces can be employed to direct this particular fragment to some other destination (away from the agglomerated whole) where the material can be extracted at convenience.

Block 104 of the described process 100 provides for producing a solid agglomerated space-borne body. By one approach, when the selected bodies are simply brought into the target accretion region 205, gravitational attraction amongst the selected bodies may be sufficient to produce the agglomerated space-borne body. By another approach, when two or more of the bodies are fragmented as described above, the fragments and unfragmented bodies are brought together by gravitational forces 105 amongst and between these fragments and bodies in the target accretion region 205 to thereby produce the desired accretion of these components into a resultant agglomerated space-borne body.

Gravitational force is proportional to the mass of the objects and inversely proportional to the square of the distance between the objects. Thus, relatively large bodies such as comets and large asteroids in close proximity to each other will have a strong enough gravitational attraction to join and form a larger body that also exhibits the characteristics of a celestial body.

If desired, the production of the agglomerated space-borne body can further comprise applying non-gravitational supplemental force 106 within the target accretion region 205. Examples of non-gravitational supplemental forces include but are not limited to restraints (such as nets or other physical limits), explosive forces, controlled motive forces, and so forth.

By one approach, all of the selected space-borne natural bodies are directed into the target accretion region to more or less collide either substantially simultaneously or within a relatively short period of time (such as within 10 minutes, 12 hours, or one week). By another approach, introduction of one or more of the selected space-borne natural bodies into the target accretion region 205 is purposefully delayed some period of time (such as two weeks, one month, six months, or one year). To at least a large extent such collisions will not cause the colliding objects to draw substantially apart because the gravitational force acting between them will continue to draw them together. In addition, if desired, artificial means of choice can be employed to artificially act on the objects to help keep the objects together.

As the agglomerated space-borne body forms and increases in mass, the agglomerated space-borne body will exert an increasing gravitational pull on other unselected/undirected comets and asteroids as well as micrometeorites that are in close proximity to the agglomerated space-borne body. With due consideration for Newton's second and third laws of motion, celestial objects in the immediate vicinity that are similar in mass will accelerate toward each other and hence directly lead to the desired accretion of material that in turn contributes to formation of the agglomerated space-borne body.

When the agglomerated space-borne body becomes relatively large it will cease to accelerate as much toward smaller celestial objects. Smaller celestial objects, however, will accelerate faster toward the relatively large agglomerated space-borne body. Accordingly the agglomerated space-borne body can and will continue to grow in mass and size even after the above-described selection/direction/fragmentation/accretion process is substantially complete. To some significant extent the rate of growth of the agglomerated space-borne body can be controlled by the temporally-controlled introduction of additional accretion-ready material into the vicinity of the body itself.

At block 107 of this process 100 a human habitat can be formed on the agglomerated space-borne body. This human habitat may be temporary or permanent as desired. The human habitat may be formed essentially on the surface of the agglomerated space-borne body or may be formed fully or nearly fully beneath the surface of the agglomerated space-borne body. By one approach, materials extracted from the agglomerated space-borne body are used, in whole or in part, to provide building materials for the human habitat.

By one approach, spectroscopy can serve to determine the gases that will be found on certain selected bodies (such as comets). Through appropriate selection in these regards, the resultant agglomerated space-borne body can have a native supply of gases that are useful to the formation of a suitable human-friendly atmosphere (either on the surface of the body or in sheltered/contained areas as appropriate).

Those skilled in these arts will appreciate that the agglomerated space-borne body will offer numerous benefits and opportunities as regards supporting a human habitat. The iron that the agglomerated space-borne body contains can constitute a core and mantle for the body while humans can live and construct infrastructure on the external crust. The water and organic compounds contained on the agglomerated space-borne body on top of the core-mantle interface can form clays. Organic compounds in the body will also contain a variety of amino acids, some of which may be rare on Earth. These amino acids can be synthesized or otherwise leveraged to make proteins for use in supporting and sustaining human life.

By one approach the agglomerated space-borne body will spin on an axis. Or, if desired, the agglomerated space-borne body can lack such spin, such that one side of the agglomerated space-borne body continually faces the Sun (or the Earth or other body or point of interest) at all times.

By one approach, the agglomerated space-borne body will have a magnetic field when minerals and rocks with magnetic properties are combined in the interior of the agglomerated space-borne body. Such material can possess atoms having even numbers of orbiting electrons, half of which circulate in a first direction and a remaining half that circulate in the opposite direction. Their effects will not cancel and there will be unpaired electrons that will cause the spins of the adjacent atoms and molecules to align. Their principle alignment will be due in large measure to the axial spin of the agglomerated space-borne body. This will lead to a dominant unique field direction.

The charges in motion will create a magnetic field for the agglomerated space-borne body. Electric currents will flow in the core of the agglomerated space-borne body. In addition, there will be electrically conductive materials in the crust of the agglomerated space-borne body from rock magnetization acquired in the early formation of the body. Accordingly there will be induced currents flowing in the crust as well as external to the body.

There will be currents in the ionosphere of the agglomerated space-borne body. That is, there will be charged particles in regions of the agglomerated space-borne body's atmosphere. These particles, together with winds and daily tidal motions, will drive dynamo-like currents on and around the agglomerated space-borne body.

The geomagnetic field of the agglomerated space-borne body will therefore consist of currents induced to flow from the electrically conducting parts of the agglomerated space-borne body, fields from geologic materials of the agglomerated space-borne body that have been magnetized, and fields from current systems found in the ionosphere and magnetosphere of the agglomerated space-borne body.

A human habitat formed on such an agglomerated space-borne body that is located relatively close to the Earth can be leveraged in a variety of useful ways. Examples include but are not limited to serving as a vault or depository of precious metals that can back currency, serving as a base from which military force can be projected across Earth orbit and the solar system, serving as a port to support commercial and civil fleets of spacecraft, serving as a node in an interplanetary Internet (as described below in more detail), serving as an economic zone to support a massive of amount of manufacturing facilities, and serving as a resort, to note but a few.

At block 108 of this process 100 the agglomerated space-borne body can be mined to obtain resources such as useful minerals. As suggested above, some or all of those mined materials can be used as building materials for structures formed in or on the agglomerated space-borne body. By another approach, in lieu of the foregoing or in combination therewith, at block 109 the resources can be transported to another location such as Earth. At block 110 these resources are then employed at the destination (such as Earth) to manufacture finished items.

At block 111 (and referring now as well to FIG. 5) these teachings will provide for operating a wireless communications node at and from the agglomerated space-borne body 502. This wireless communications node 501 can support wireless communications from point to point on the agglomerated space-borne body 502. For example, the wireless communications node 501 can support wireless communications with a wireless communications portable device 503 carried by individual persons or vehicles on or above the agglomerated space-borne body 502. As another example the wireless communications node 501 can support wireless communications with another like wireless communications node 504 that is also deployed on the agglomerated space-borne body 502.

Figure 5:
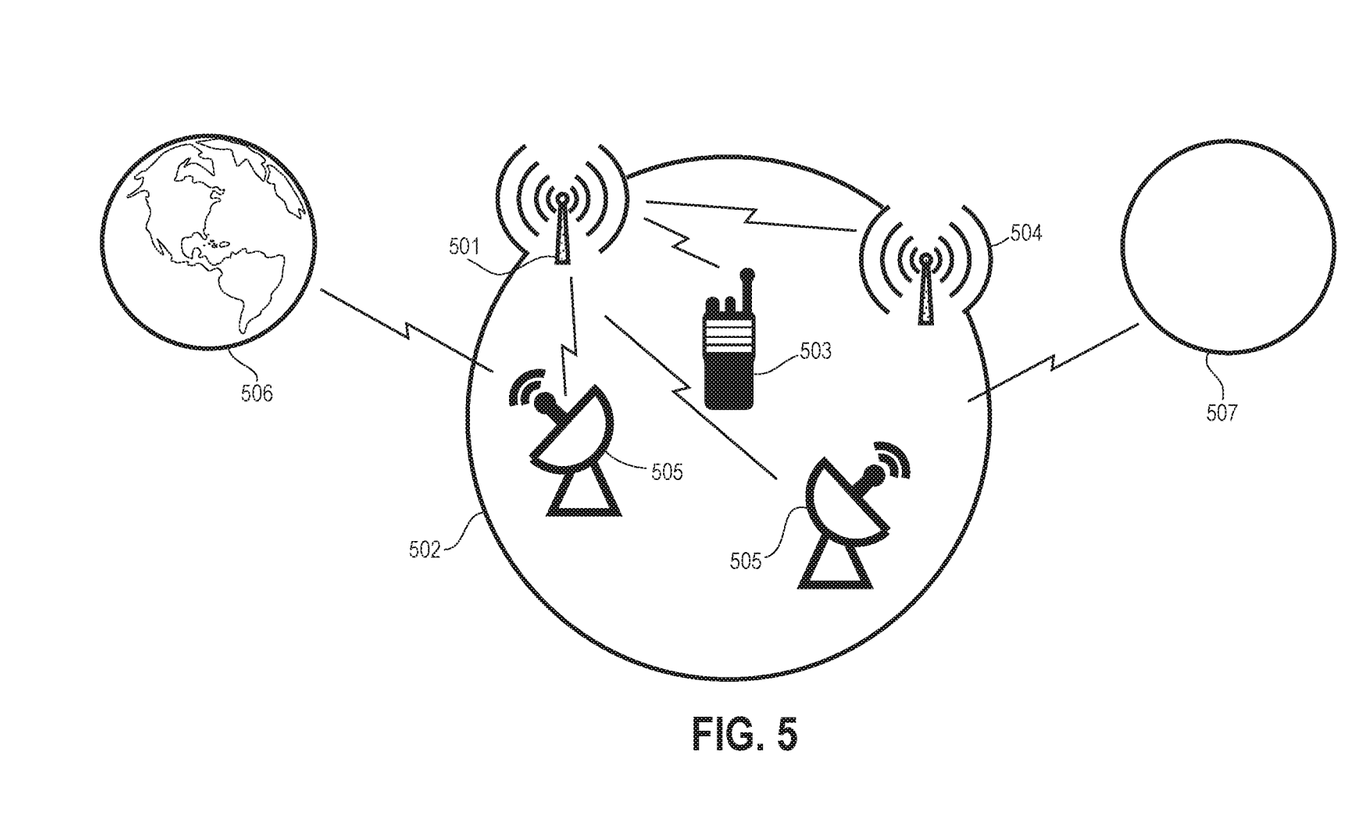
FIG. 5 comprises a schematic view depicting wireless communications infrastructure as configured in accordance with various embodiments of these teachings.

As yet another example the wireless communications node 501 can support wireless communications with one or more long-range wireless communication platforms 505. So configured, when one of the long-range wireless communication platforms 505 provides a wireless link to Earth 506, the wireless communications node 501 can support wireless communications between points on the agglomerated space-borne body 502 and points on Earth 506.

As another example, the wireless communications node 501 can act as a relay to support wireless communications between points on Earth 506 and other points that are neither on the Earth 506 nor on the agglomerated space-borne body 502. This other point may be, for example, a non-Earth planet such as Mars 507 or another artificially-created agglomerated space-borne body.

These teachings will accommodate a wide variety of wireless communications methodologies and protocols including voice-only, data-only, and voice-and-data compatible protocols. For many application settings the wireless communications node 501 can be configured to compatibly support communications using either or both of Internet Protocol version 4 and Internet Protocol version 6. So configured, such a wireless communication node 501 can help to extend the Internet in useful ways throughout space.

These teachings provide a way to artificially place a significant number of sizable celestial objects (such as asteroids and comets) in close proximity to each other. More particularly, at least some of these objects are caused to fragment into smaller pieces. Gravity then attracts these objects to each other to thereby form, for example, an object on the scale of a moon in Earth orbit, a dwarf planet between the orbits of the Earth and Mars, or a dwarf planet with the same astronomical unit (AU) of distance from the Sun as the Earth (and potentially in the same orbit as the Earth). These objects can then serve any of a variety of purposes including human habitats, accessible resources for manufacturing or the like, a communications hub, and so forth.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:
1. A method comprising:
artificially directing each of a plurality of space-borne natural bodies to a target accretion region to thereby direct the plurality of space-borne natural bodies into controlled collisions with one another within the target accretion region, such that gravitational forces amongst the plurality of space-borne natural bodies within the target accretion region produces an agglomerated space-borne body comprised of at least portions of the plurality of space borne natural bodies.

2. The method of claim 1 wherein at least one of the plurality of space-borne natural bodies comprises an asteroid.

3. The method of claim 1 wherein at least one of the plurality of space-borne natural bodies comprises a comet.

4. The method of claim 1 wherein at least one of the plurality of space-borne natural bodies comprises a moon.

5. The method of claim 1 wherein artificially directing each of the plurality of space-borne natural bodies comprises, at least in part, selectively modifying orbital eccentricity and inclination for at least one of the plurality of space-borne natural bodies.

6. The method of claim 1 wherein artificially directing each of the plurality of space-borne natural bodies comprises, at least in part, increasing relative acceleration between at least two of the plurality of space-borne natural bodies towards one another.

7. The method of claim 1 wherein artificially directing each of the plurality of space-borne natural bodies comprises, at least in part, selectively controlling an angle at which at least two of the plurality of space-borne natural bodies collide with one another.

8. The method of claim 1 further comprising:
fragmenting at least one of the plurality of space-borne natural bodies to form corresponding fragments such that gravitational forces within the target accretion region cause at least some of the fragments to accrete with the agglomerated space-borne body.

9. The method of claim 1 further comprising:
identifying a plurality of candidate space-borne natural bodies;
selecting particular ones of the plurality of candidate space-borne natural bodies to direct to the target accretion region based upon at least one selection criterion.

10. The method of claim 9 wherein the at least one selection criterion comprises at least one of:
elemental make up;
current relative trajectory;
current relative velocity.

11. The method of claim 1 further comprising:
applying non-gravitational supplemental force within the target accretion region to further support production of the agglomerated space-borne body.

12. The method of claim 1 further comprising:
mining the agglomerated space-borne body to obtain resources;
transporting the resources to Earth;
using the resources on Earth to manufacture finished items.

13. The method of claim 1 further comprising:
forming a human habitat on the agglomerated space-borne body.

14. The method of claim 1 further comprising:
operating a wireless communications node from the agglomerated space-borne body.

15. The method of claim 14 wherein the wireless communications node supports wireless communications from point to point on the agglomerated space-borne body.

16. The method of claim 15 wherein the wireless communications node further supports wireless communications between points on the agglomerated space-borne body and points on Earth.

17. The method of claim 16 wherein the wireless communications node further supports wireless communications between points on the Earth and other points that are neither on the Earth nor on the agglomerated space-borne body.

18. The method of claim 17 wherein the points that are neither on the Earth nor on the agglomerated space-borne body include at least one point on a non-Earth planet.

19. The method of claim 18 wherein the non-Earth planet is Mars.

20. The method of claim 18 wherein the wireless communications node compatibly supports communications using at least one of Internet Protocol version 4 and Internet Protocol version 6.

* * * * *